(12) United States Patent
Zhou

(10) Patent No.: US 12,388,912 B1
(45) Date of Patent: Aug. 12, 2025

(54) CLIENT COMMUNICATION NETWORK, NETWORK REQUEST PROCESSING METHOD, COMMUNICATION SYSTEM, ELECTRONIC DEVICE AND MEDIUM

(71) Applicant: Baidu International Technology (Shenzhen) Co., Ltd., Shenzhen (CN)

(72) Inventor: Deping Zhou, Shenzhen (CN)

(73) Assignee: Baidu International Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 18/702,290

(22) PCT Filed: Aug. 8, 2023

(86) PCT No.: PCT/CN2023/111656
§ 371 (c)(1),
(2) Date: Apr. 17, 2024

(87) PCT Pub. No.: WO2024/198192
PCT Pub. Date: Oct. 3, 2024

(30) Foreign Application Priority Data

Mar. 31, 2023 (CN) .......................... 202310362218.0

(51) Int. Cl.
*H04L 67/63* (2022.01)
*H04L 9/40* (2022.01)
*H04L 67/02* (2022.01)

(52) U.S. Cl.
CPC .......... *H04L 67/63* (2022.05); *H04L 63/0428* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 9,930,209 B2 * | 3/2018 | Tamura | H04N 1/32771 |
| 2014/0215043 A1 * | 7/2014 | Ryu | G06F 16/955 709/223 |
| 2017/0272607 A1 * | 9/2017 | Tamura | H04N 1/00941 |
| 2021/0240497 A1 * | 8/2021 | Thulasi | G06F 9/546 |

* cited by examiner

*Primary Examiner* — Quang N Nguyen
(74) *Attorney, Agent, or Firm* — Knobbe, Martens, Olson & Bear, LLP

(57) ABSTRACT

Provided is a client communication network, a network request processing method, a communication system, an electronic device and a medium, relating to the field of computer technology. The client communication network comprises: a client communication implementation library configured to initiate a custom network request to a target underlying library; the target underlying library configured to use a third-party network library to obtain custom response data corresponding to the custom network request; wherein the third-party network library is a communication network library corresponding to the target underlying library; and a service layer configured to parse the custom response data to obtain a data parsing result.

18 Claims, 9 Drawing Sheets

CLIENT COMMUNICATION NETWORK, NETWORK REQUEST PROCESSING METHOD, COMMUNICATION SYSTEM, ELECTRONIC DEVICE AND MEDIUM

CROSS-REFERENCE TO RELATED APPLICATIONS

This application is a National Stage of International Application No. PCT/CN2023/111656, filed on Aug. 8, 2023, which claims priority to Chinese Patent Application No. CN202310362218.0, filed on Mar. 31, 2023, both of which are hereby incorporated by reference in their entireties.

TECHNICAL FIELD

The present disclosure relates to the field of computer technology, and specifically to a client communication network, a network request processing method, a communication system, an electronic device and a medium.

BACKGROUND

Currently, the communication between a client and a server is implemented based on a client communication network loaded on a terminal device. However, the service layer of the relevant client communication network often has a strong dependency on the communication network library. When the communication network library is replaced, the service side cannot be unaware of the replacement. This will increase the maintenance cost of the client communication network and reduce the stability of the client communication network.

SUMMARY

In a first aspect of the embodiments of the present disclosure, provided is a client communication network, including: a client communication implementation library configured to initiate a custom network request to a target underlying library: the target underlying library configured to use a third-party network library to obtain custom response data corresponding to the custom network request, where the third-party network library is a communication network library corresponding to the target underlying library; and a service layer configured to parse the custom response data to obtain a data parsing result.

In a second aspect of the embodiments of the present disclosure, provided is a network request processing method, applied to an electronic device configured with a client communication implementation library, a target underlying library and a service layer: where the network request processing method includes: initiating, by the client communication implementation library, a custom network request to the target underlying library: using, by the target underlying library, a third-party network library to obtain custom response data corresponding to the custom network request, where the third-party network library is a communication network library corresponding to the target underlying library; and parsing, by the service layer, the custom response data to obtain a data parsing result.

In a third aspect of the embodiments of the present disclosure, provided is a communication system, including: a third-party network library, and the client communication network provided in the first aspect of the embodiments of the present disclosure.

In a fourth aspect of the embodiments of the present disclosure, provided is an electronic device, including: at least one processor, and a memory connected in communication with the at least one processor: where the memory stores an instruction executable by the at least one processor, and the instruction, when executed by the at least one processor, enables the at least one processor to execute the network request processing method provided in the second aspect of the embodiments of the present disclosure.

In a fifth aspect of the embodiments of the present disclosure, provided is a non-transitory computer-readable storage medium storing a computer instruction thereon, and the computer instruction is used to cause a computer to execute the network request processing method provided in the second aspect of the embodiments of the present disclosure.

In a sixth aspect of the embodiments of the present disclosure, provided is a computer program product including a computer program, and the computer program implements the network request processing method provided in the second aspect of the embodiments of the present disclosure, when executed by a processor.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope of the present disclosure. Likewise, for clarity and conciseness, descriptions of well-known functions and structures are omitted in the following descriptions.

Currently, the communication between a client and a server is implemented based on a client communication network loaded on a terminal device. Here, the client communication network is the network architecture of the client, for example, the network architecture of the Android client.

However, the service layer in the relevant client communication network often has a strong dependency on the communication network library. Specifically, in the relevant client communication network, the client communication implementation library and the service layer usually interact directly with a first communication network library to directly call the communication interface and request sending method related to the first communication network library. Then, when the first communication network library needs to be replaced, for example, when the first communication network library needs to be replaced with a second communication network library, both the client communication implementation library and the service layer need to be replaced accordingly to match the second communication network library, and the service side cannot be unaware of the replacement. Since the replacement process involves a large number of code modifications, the maintenance cost of the client communication network will be increased, and the stability of the client communication network will be reduced.

Based on this, an embodiment of the present disclosure provides a client communication network, which can be mounted on an electronic device. The client communication network provided in the embodiment of the present disclosure will be described below with reference to the schematic diagram of the network architecture shown in FIG. 1.

Figure 1:
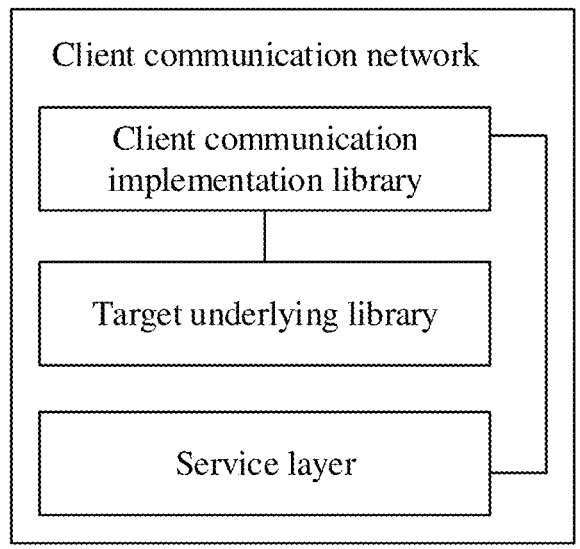
FIG. 1 is a schematic diagram of a network architecture of a client communication network according to an embodiment of the present disclosure.

As shown in FIG. 1, the client communication network includes: a client communication implementation library configured to initiate a custom network request to a target underlying library: the target underlying library configured to use a third-party network library to obtain custom response data corresponding to the custom network request, where the third-party network library is a communication network library corresponding to the target underlying library; and a service layer configured to parse the custom response data to obtain a data parsing result.

Here, the client communication implementation library can be used to provide an efficient and feature-rich client programming toolkit that can support Hyper Text Transfer Protocol (Http), and can also be called HttpClient in the field of computer technology.

Figure 2:
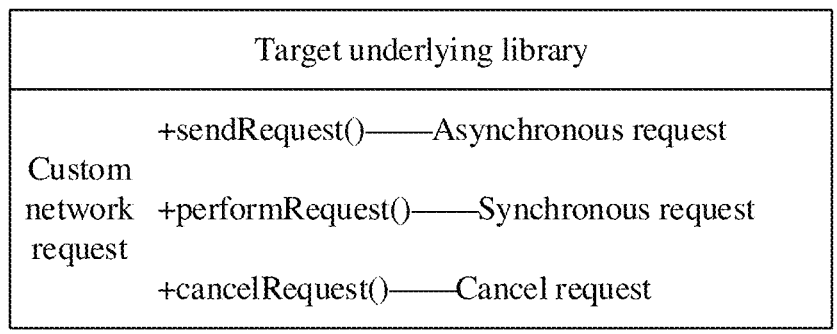
FIG. 2 is an architectural schematic diagram of a target underlying library according to an embodiment of the present disclosure.

Moreover, referring to FIG. 2, the custom network request in the embodiment of the present disclosure may be an abstract method defined by the service party that needs to be implemented, and may include at least one of the three subject categories. For example, the custom network request may be an asynchronous request (sendRequest) or a synchronous request (performRequest) or a cancel request (cancelRequest), which is not limited in the embodiments of the present disclosure. The target underlying library is configured to inherit the implementation category in the third-party network library to handle the custom network request. Here, the third-party network library is a communication network library corresponding to the target underlying library, and for example, may be an Okhttp network library or a Cronet network library. Here, the Okhttp network library can be implemented through the Java platform, and the Cronet network library can be implemented through the C++ platform. Therefore, the Cronet network library has the cross-platform capability and supports mobile operating systems such as iOS and Android. Moreover, the Cronet network library also supports the third generation of hypertext transfer protocol, that is, Http3.

Based on the above description, it can be understood that, in the embodiment of the present disclosure, after receiving the custom network request initiated by the client communication implementation library, the target underlying library can inherit the implementation category in the third-party network library to process the custom network request, obtain the custom response data corresponding to the custom network request, send the custom response data to the service layer, and parse the custom response data through the service layer to obtain the data parsing result. Here, the target underlying library can send the custom response data to the service layer through the client communication implementation library.

Using the client communication network provided in the embodiment of the present disclosure, the custom network request can be initiated by the client communication implementation library to the target underlying library: the target underlying library uses the third-party network library to obtain the custom response data corresponding to the custom network request, and sends the custom response data to the service layer; and the service layer parses the custom response data to obtain the data parsing result. In the embodiment of the present disclosure, the target underlying library is added between the client communication implementation library and service layer and the third-party network library, and the target underlying library can use the third-party network library to obtain the custom response data corresponding to the custom network request, so that the client communication implementation library and the service layer do not need to pay attention to the implementation category in the third-party network library, realizing the decoupling of the service side from the third-party network library. In this way, even if the third-party network library needs to be replaced by other communication network library, there is no need to replace the client communication implementation library and the service layer, so that the service side is unaware of the replacement, thereby reducing the maintenance cost of the client communication network, and improving the stability of the client communication network.

In some specific implementations, the target underlying library may be configured to: convert the custom network request to obtain a standard network request available to the third-party network library: send the standard network request to the third-party network library, where the third-party network library initiates the standard network request to a server and obtains standard response data returned by the server based on the standard network request: obtain the standard response data returned by the third-party network library; and encapsulate the standard response data into the custom response data corresponding to the custom network request.

In a specific example, after determining the type of the custom network request, the target underlying library can convert the custom network request according to the type of the custom network request, obtain the standard network request available to the third-party network library, and then send the standard network request to third-party network library. The third-party network library calls the corresponding request processing logic (implementation category), initiates the standard network request to the server, obtains the standard response data returned by the server based on the standard network request, and returns the standard response data to the target underlying library. The target underlying library encapsulates the standard response data into the custom response data corresponding to the custom network request.

The standard network request is a network request defined in the third-party network library and has a corresponding implementation category in the third-party network library, and can be processed through the implementation category, thus realizing the processing of the custom network request.

Based on the above functions of the target underlying library, it is only necessary to simply convert the custom network request through the target underlying library to obtain the standard network request available to the third-party network library in the embodiment of the present disclosure. After that, the target underlying library sends the standard network request to the third-party network library to initiate the standard network request to the server through the third-party network library, obtains the standard response data returned by the server based on the standard network request, and then encapsulates the standard response data into the custom response data corresponding to the custom network request. This process has simple processing logic and takes a short time, and can improve the work efficiency of the client communication network.

In some specific implementations, the target underlying library may be specific configured to convert the custom network request to obtain the standard network request available to the third-party network library by implementing the following functions: parsing the custom network request to obtain a type of the custom network request and a data structure of the custom network request: determining a standard request structure corresponding to the type of the custom network request in the third-party network library when determining that the type of the custom network request belongs to types supported by the third-party network library; and converting the data structure of the custom network request according to the standard request structure, to obtain the standard network request available to the third-party network library.

In the embodiment of the present disclosure, the purpose of parsing the custom network request is to obtain the type of the custom network request and the data structure of the custom network request.

Here, the type of the custom network request may include subject category and mode. Moreover, as mentioned above, the custom network request in the embodiment of the present disclosure may include at least one of three subject categories: asynchronous request (sendRequest), synchronous request (performRequest), or cancel request (cancelRequest).

Figure 3:
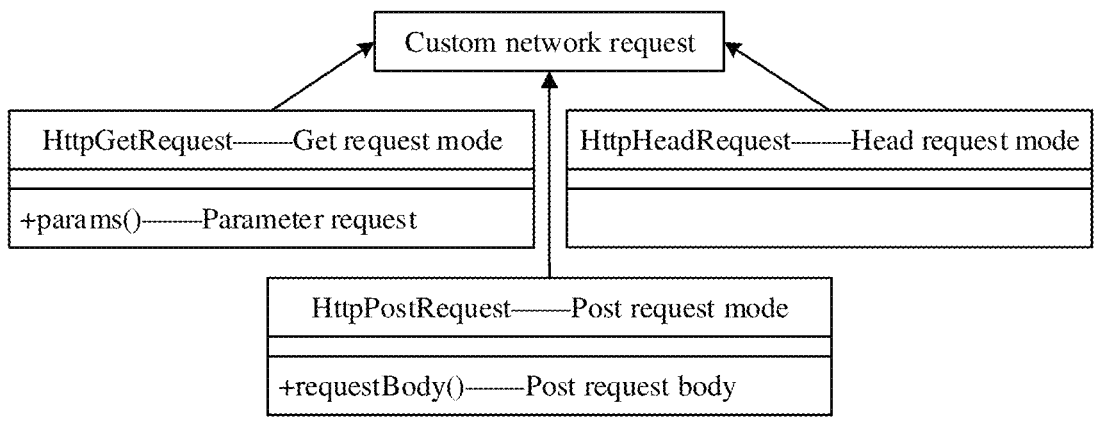
FIG. 3 is a schematic diagram of requested subject classification according to an embodiment of the present disclosure.

Referring to FIG. 3, the custom network request under each subject category may include at least one of Get mode (HttpGetRequest), Post mode (HttpPostRequest) or Head mode (HttpHeadRequest); and each mode has an abstract method defined by the service party itself, for example, a parameter request method (params) in the Get mode (HttpGetRequest). Moreover, it should be noted that other modes can also be expanded according to actual application requirements in the embodiment of the present disclosure, and will not be described here.

Figure 4:
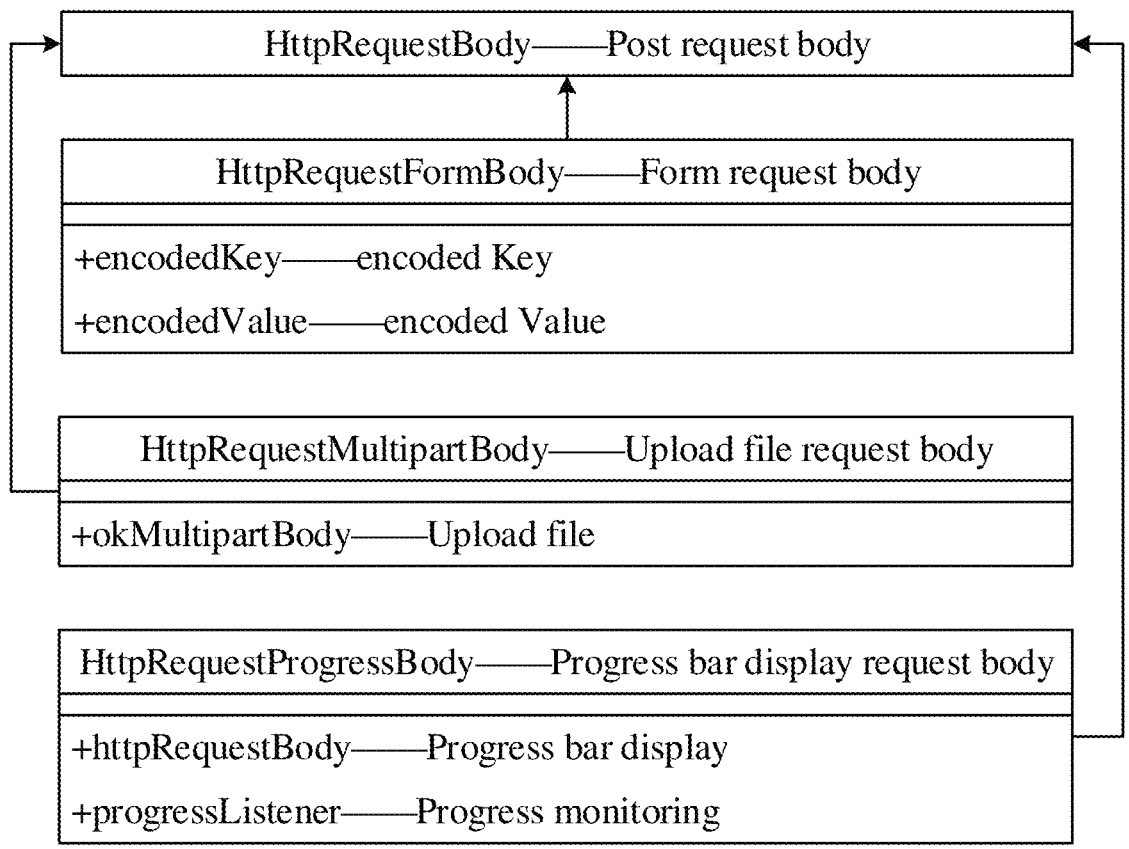
FIG. 4 is a schematic diagram of expansion of the Post request body according to an embodiment of the present disclosure.

Referring to FIG. 4 again, in the embodiment of the present disclosure, for the Post mode, the request body (HttpRequestBody) can also be expanded to support a variety of network requests with different demands, such as Form request, upload file, progress bar display, etc., specifically as described in 1 to 3 below.

1. The Form request body (HttpRequestFormBody) obtained by expanding the Post request body (HttpRequestBody) is used to request the sending of the network data in the Key type or Value type, and also has abstract methods defined by the service party itself, for example, a method of encrypting the network data in the Key type (encodedKey), and a method of encrypting the network data in the Value type (encoded Value).

2. The upload file request body (HttpRequestMultipartBody) obtained by expanding the Post request body (HttpRequestBody) is used to request the uploading of files, and also has abstract methods defined by the service party itself, for example, a method of uploading files (okMultipartBody).

3. The progress bar display request body (HttpRequestProgressBody) obtained by expanding the Post request body (HttpRequestBody) is used to request the display of the progress bar, and the internal request body (httpRequestBody) is actually a layer aggregated Delegate to expand the progress bar display function; and moreover, the progress bar display request body (HttpRequestProgressBody) also has abstract methods defined by the service party itself, for example, a method of monitoring the progress bar (progressListener).

It can be understood that, in the embodiment of the present disclosure, for the above custom network requests of different subject categories and different modes, the target underlying library can process them by inheriting the corresponding implementation categories in the third-party network library, which will not be described again here.

Moreover, in the embodiment of the present disclosure, the data structure of the custom network request is used to represent the data composition structure of the custom network request, which will not be described again here.

In the embodiment of the present disclosure, after parsing the custom network request to obtain the type of the custom network request and the data structure of the custom network request, the target underlying library can determine whether the type of the custom network request belongs to the types supported by the third-party network library, further determine the standard request structure corresponding to the type of the custom network request in the third-party network library when determining that the type of the custom network request belongs to the types supported by the third-party network library, and then convert the data structure of the custom network request according to the standard request structure, so that the custom network request has the same data composition structure as the standard request structure, to obtain the standard network request available to the third-party network library.

Based on the above functions of the target underlying library, in the embodiment of the present disclosure, after the custom network request is parsed to obtain the type of the custom network request and the data structure of the custom network request, the standard request structure corresponding to the type of custom network request in the third-party network library can be determined when it is determined that the type of the custom network request belongs to the types supported by the third-party network library, and the data structure of the custom network request can be converted according to the standard request structure to obtain the standard network request available to the third-party network library. On the one hand, this process has simple processing logic and takes a short time, so the working efficiency of the client communication network can be improved. On the other hand, there are more types that can be supported by the third-party network library, so the custom network request can also have more extensible types, thus improving the availability of the client communication network.

Figure 5:
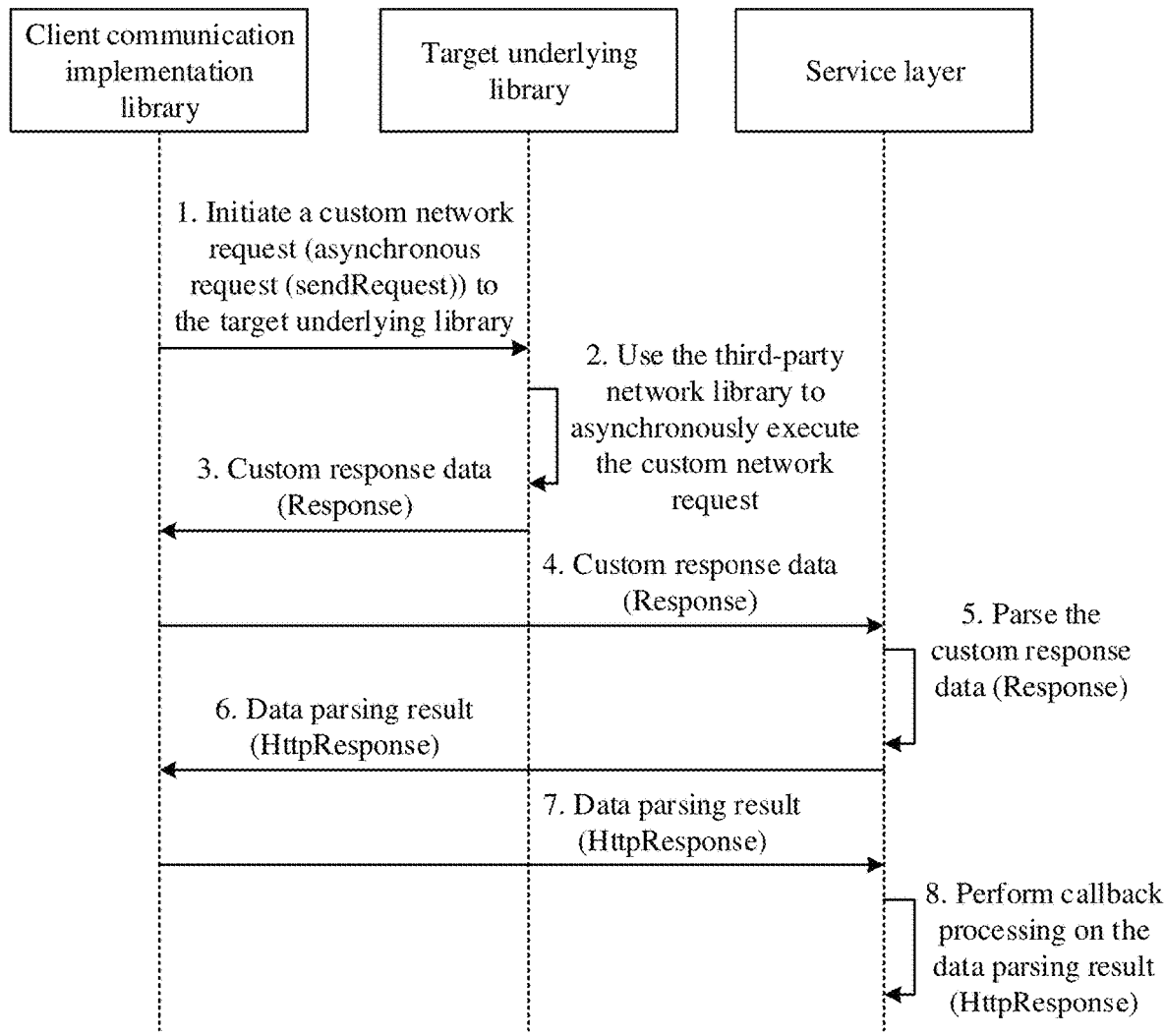
FIG. 5 is a schematic flowchart of a network request processing method according to an embodiment of the present disclosure.

The overall process of a network request processing method corresponding to the client communication network provided in the embodiment of the present disclosure will be illustrated below with reference to FIG. 5.

1. The client communication implementation library initiates a custom network request to the target underlying library, where the custom network request is specifically an asynchronous request (sendRequest).

2. The target underlying library uses the third-party network library to asynchronously execute the custom network request. Specifically, the target underlying library calls the corresponding request processing logic through the third-party network library and initiates a standard network request corresponding to the custom network request to the server: the third-party network library obtains the standard response data returned by the server based on the standard network request and returns the standard response data to the target underlying library; and the target underlying library encapsulates the standard response data into the custom response data (Response) corresponding to the custom network request.

3. The target underlying library sends the custom response data (Response) to the client communication implementation library.

4. The client communication implementation library sends the custom response data (Response) to the service layer.

5. The service layer parses the custom response data (Response) to obtain a data parsing result (HttpResponse).

6. The service layer sends the data parsing result (HttpResponse) to the client communication implementation library.

7. The client communication implementation library then sends the data parsing result (HttpResponse) to the service layer.

8. The service layer performs callback processing on the data parsing result (HttpResponse).

Moreover, it should be noted that, in the embodiment of the present disclosure, when the custom network request is a synchronous request (performRequest), the above steps 2 to 5 are to process the custom network request in the synchronous manner: that is, since the custom network request is specifically a synchronous request (performRequest), the service layer directly obtains the data parsing result (HttpResponse) through step 5, and the process related to the callback processing described in steps 6, 7 and 8 above is non-existent.

It can be understood that, in the overall process of the network request processing method described above, all the categories used by the service side are customized in the client communication network, including: custom network request, custom response data, client communication implementation library, etc., without directly relying on the categories in third-party network library; and moreover, the process instructions for network request processing are also encapsulated in the corresponding implementation categories in the target underlying library to complete all operations such as initiating, receiving, processing and distribution; and finally, the encapsulated data parsing result is returned to the service layer, thus ensuring that the service side is unaware of the third-party network library.

In some optional implementations, the target underlying library may further configured to send a monitoring data packet to the service layer after receiving the monitoring data packet; where the monitoring data packet is obtained by the third-party network library by monitoring a processing process of the standard network request, and is sent to the target underlying library.

That is to say, in the embodiment of the present disclosure, the service layer can also monitor the full flow of the request processing process of the standard network request based on the monitoring processing logic (implementation category) stored in the third-party network library. For example, the service layer can monitor whether each subdivided flow in the request processing process is successfully processed and the processing time of each subdivided flow.

Figure 6:
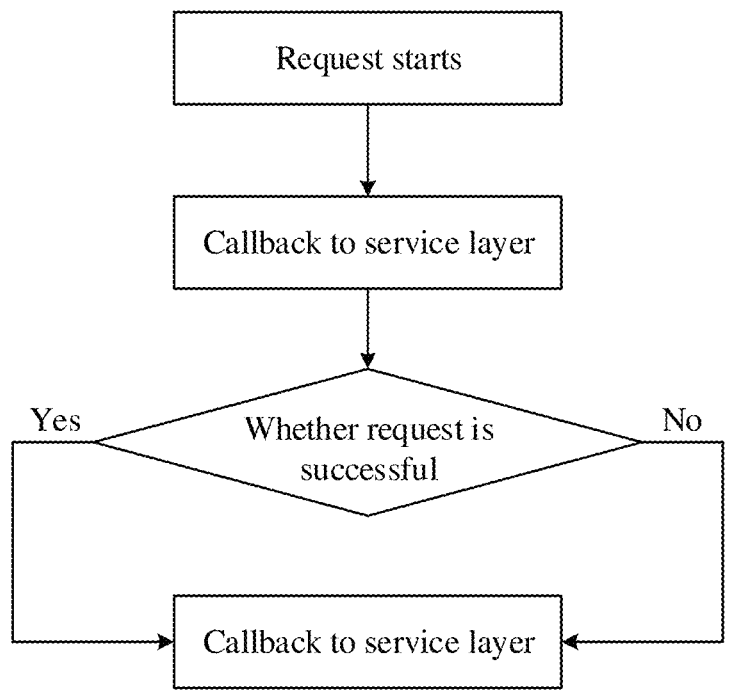
FIG. 6 is a schematic diagram of a monitoring process according to an embodiment of the present disclosure.

The subdivided flows include Domain Name System (DNS) parsing flow, connection establishment flow, Secure Sockets Layer (SSL) connection establishment flow, actual request processing flow, etc. Moreover, referring to FIG. 6, after the subdivided flows such as request start, request completion and request failure included in the actual request processing flow end, the target underlying library may also carry the execution result, processing time and other data into the monitoring data package and uniformly call them back to the service layer; and thus, the service layer can determine whether each network request is successful and the time consuming situation of each subdivided flow based on the monitoring data packet.

Based on the above functions of the target underlying library, in the embodiment of the present disclosure, the target underlying library may further be configured to send the monitoring data packet to the service layer after receiving the monitoring data packet obtained by the third-party network library by monitoring the processing process of the standard network request, so that the service layer can trace the full flow of the request processing process, thereby facilitating the maintenance of the client communication network and further reducing the maintenance cost of the client communication network.

In some optional implementations, the target underlying library may further be configured to: extract standard abnormal data from the monitoring data packet when the monitoring data packet carries the standard abnormal data: convert the standard abnormal data into corresponding custom abnormal data; and send the custom abnormal data to the service layer by carrying the custom abnormal data in the monitoring data packet.

In the embodiment of the present disclosure, when the monitoring data package carries the standard abnormal data, the target underlying library can extract the standard abnormal data from the monitoring data package, and then convert the standard abnormal data into the corresponding custom abnormal data. In a specific example, the target underlying library can convert the standard abnormal data into the corresponding custom abnormal data according to the abnormality correspondence stored in the target underlying library, and the custom abnormal data is defined based on the categories in the Java Development Kit (JDK).

Figure 7:
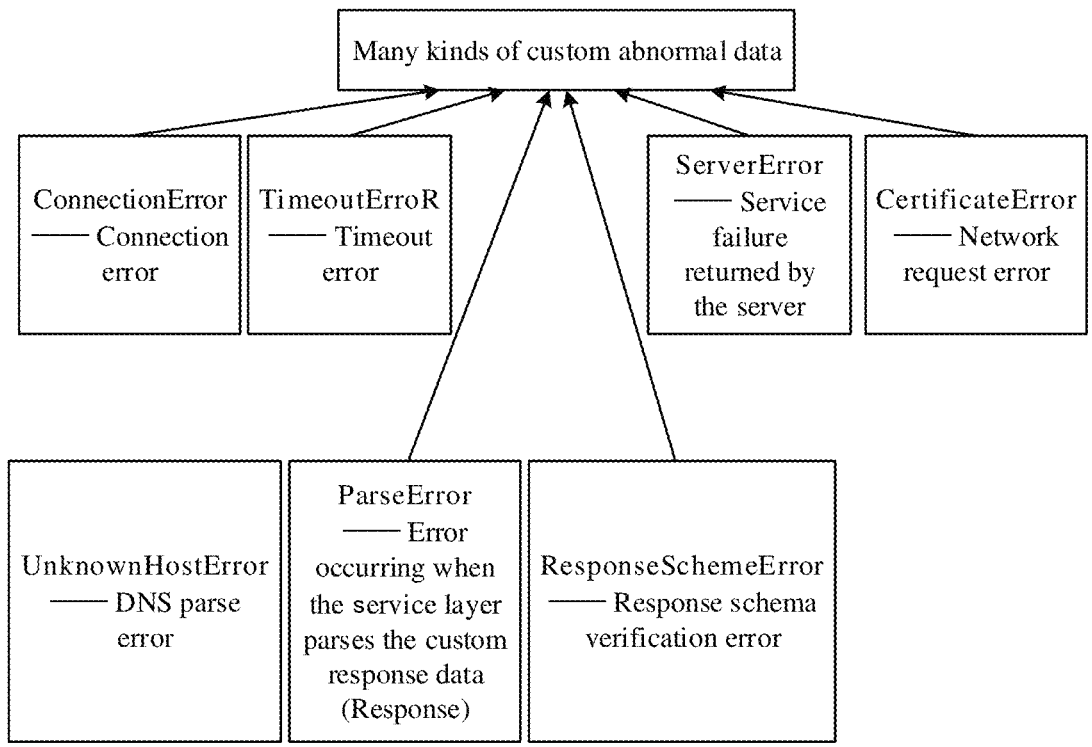
FIG. 7 is a schematic diagram of custom abnormal data according to an embodiment of the present disclosure.

Referring to FIG. 7, the following kinds of custom abnormal data are predefined in the embodiment of the present disclosure.

ConnectionError: represents a connection error and encapsulates java.net.ConnectionException.

TimeoutError: represents a timeout error and encapsulates java.net.SocketTimeoutException.

ServerError: represents the service failure returned by the server, for example, errno≠0.

CertificateError: represents a network request error, such as certificate expiration. Such error will only be thrown when certificate monitoring is enabled.

UnknownHostError: represents a DNS parse error. Such error will only be thrown when DNS parse monitoring is enabled.

ParseError: represents an error occurring when the service layer parses the custom response data (Response).

ResponseSchemeError: represents a response schema verification error. Such error will only be thrown when the response schema verification is enabled.

The abnormal codes corresponding to some custom abnormal data above can be shown in Table 1.

TABLE 1

| Abnormal code | Corresponding explanation |
|---|---|
| 10000 | Generic network error |
| 10001 | Connection error |
| 10002 | Timeout error |
| 10003 | Error occurring when parsing custom response data (Response) |
| 10004 | Response schema verification error |
| 10005 | DNS parse failure |
| 10010 | Certificate error |
| 10011 | Certificate expiration |

Based on the above functions of the target underlying library, in the embodiment of the present disclosure, when the monitoring data packet carries standard abnormal data, the standard abnormal data can be extracted from the monitoring data packet, and then the standard abnormal data can be converted into the corresponding custom abnormal data without relying on the standard abnormal data defined in the third-party network library, thereby further implementing the decoupling of the service side from the third-party network library.

In some optional implementations, the client communication implementation library may be configured to: generate the custom network request in response to a request triggering operation: determine the target underlying library for the custom network request from a plurality of candidate underlying libraries according to an underlying library selection instruction; and initiate the custom network request to the target underlying library.

Figure 8:
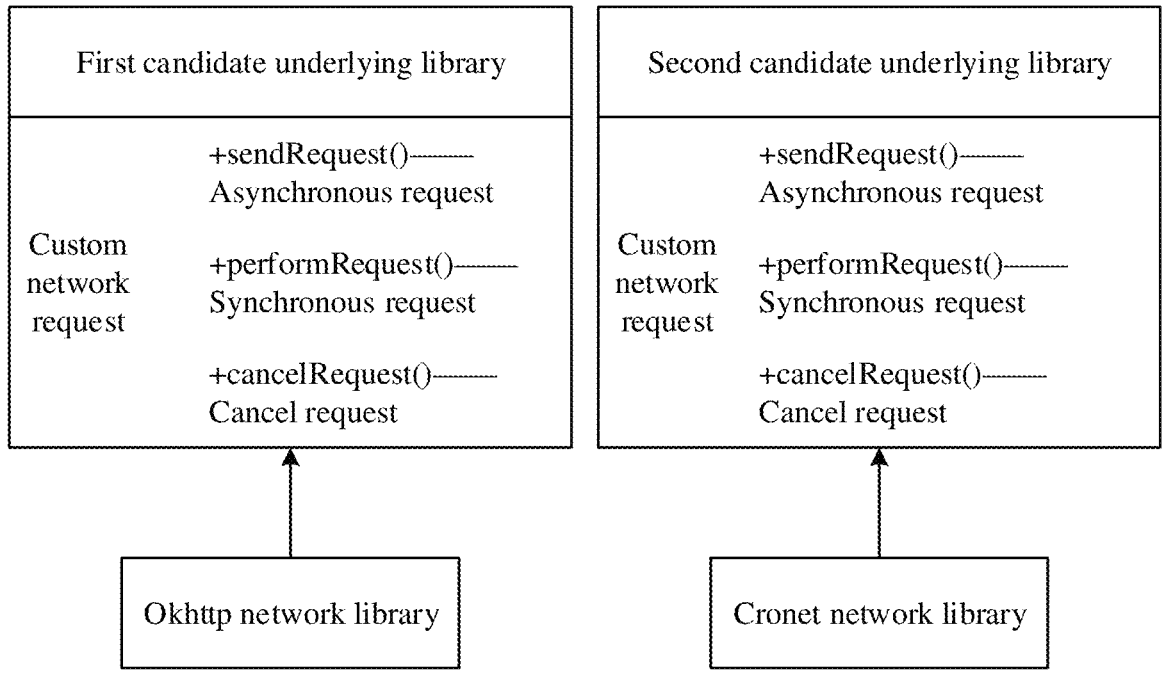
FIG. 8 is an architectural schematic diagram of a plurality of candidate underlying libraries according to an embodiment of the present disclosure.

Referring to FIG. 8, in an embodiment of the present disclosure, the client communication network may actually include a plurality of candidate underlying libraries, and each candidate underlying library has a corresponding communication network library.

In a specific example, the plurality of candidate underlying libraries may include a first candidate underlying library and a second candidate underlying library. Here, the communication network library corresponding to the first candidate underlying library may be the Okhttp network library, and the communication network library corresponding to the second candidate underlying library may be the Cronet network library.

Moreover, in an embodiment of the present disclosure, the client communication implementation library may be further configured to determine a target underlying library with excellent processing performance for the custom network request from the plurality of candidate underlying libraries, and the excellent processing performance for the custom network request may be a faster processing speed for the custom network request.

Based on the above functions of the client communication implementation library, in the embodiment of the present disclosure, after generating the custom network request in response to the request triggering operation, the client communication implementation library can determine the target underlying library with excellent processing performance for the custom network request from the plurality of candidate underlying libraries according to the underlying library selection instruction, and initiate the custom network request to the target underlying library, thereby improving the work efficiency of the client communication network. Compared with the scheme of randomly selecting the target underlying library from the plurality of candidate underlying libraries, the network request processing efficiency of the client communication network can be improved by more than 20%.

In the embodiment of the present disclosure, the underlying library selection indication may be generated by the service layer. Based on this, in some optional implementations, the service layer may further be configured to: obtain a historical request processing record related to the custom network request when monitoring the generation of the custom network request; determine the target underlying library with excellent (optimal) processing performance for the custom network request from the plurality of candidate underlying libraries according to the historical request processing record: where the optimal processing performance includes a processing speed not less than a set speed threshold: generate the underlying library selection instruction based on identification information of the target underlying library; and send the underlying library selection instruction to the client communication implementation library.

The historical processing data of other network requests in the same type as the custom network request is stored in the historical request processing record. The service layer may determine the target underlying library with excellent processing performance for the custom network request from the plurality of candidate underlying libraries according to the historical processing data. For example, the historical processing data shows a candidate underlying library with a processing speed for other network requests in the same type as the custom network request being not less than the set speed threshold and/or ranking high among all the candidate underlying libraries. Then the underlying library selection instruction is generated based on the identification information of the target underlying library, and the underlying library selection instruction is sent to the client communication implementation library.

Based on the above functions of the service layer, in the embodiment of the present disclosure, the target underlying library with excellent processing performance for the custom network request can be determined from the plurality of candidate underlying libraries according to the historical request processing record related to the custom network request. Since the historical request processing record is obtained based on the real network request processing process within the historical period, the step of determining the target underlying library with excellent processing performance for the custom network request from the plurality of candidate underlying libraries according to the historical request processing record can improve the reliability of the determined target underlying library, to ensure that the work efficiency of the client communication network can be truly and reliably improved.

Moreover, in an embodiment of the present disclosure, the plurality of candidate underlying libraries may include a target candidate underlying library, where the communication network library corresponding to the target candidate underlying library supports Http3.

In a specific example, the target candidate underlying library may be the second candidate underlying library described above, and the corresponding communication network library is Cronet network library that can support Http3.

Since Http3 has characteristics such as high speed, high security and weak network stability, the fact that the plurality of candidate underlying libraries include the target candidate underlying library whose corresponding communication network library supports Http3 makes it possible to select the target candidate underlying library supporting Http3 as the target underlying library, thereby further improving the stability of the client communication network.

Figure 9:
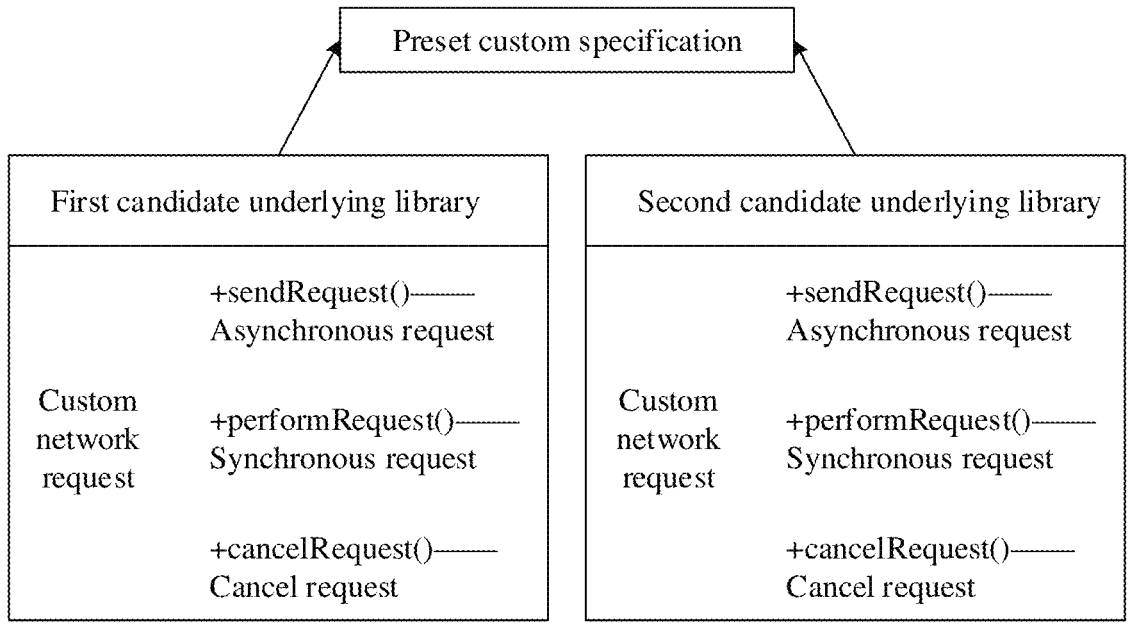
FIG. 9 is a schematic diagram of a custom constraint method for a custom network request according to an embodiment of the present disclosure.

Referring to FIG. 9. In an embodiment of the present disclosure, the custom network request may be subject to custom constraint through a preset custom specification.

The preset custom specification may at least impose custom constraint on the data composition structure of the same type of custom network requests, so that the same custom network request can be implemented universally in a plurality of candidate underlying libraries. Moreover, in the embodiment of the present disclosure, the custom constraint may be performed on the custom response data, custom abnormal data, etc. through the preset custom specification.

Since the custom network request is custom-constrained through the preset custom specification, the same type of custom network requests can be implemented universally in a plurality of candidate underlying libraries (for example, the first candidate underlying library and the second candidate underlying library in FIG. 9), which can provide convenience for adding and changing the candidate underlying libraries, and thus increase the flexibility of the client communication network.

Figure 10:
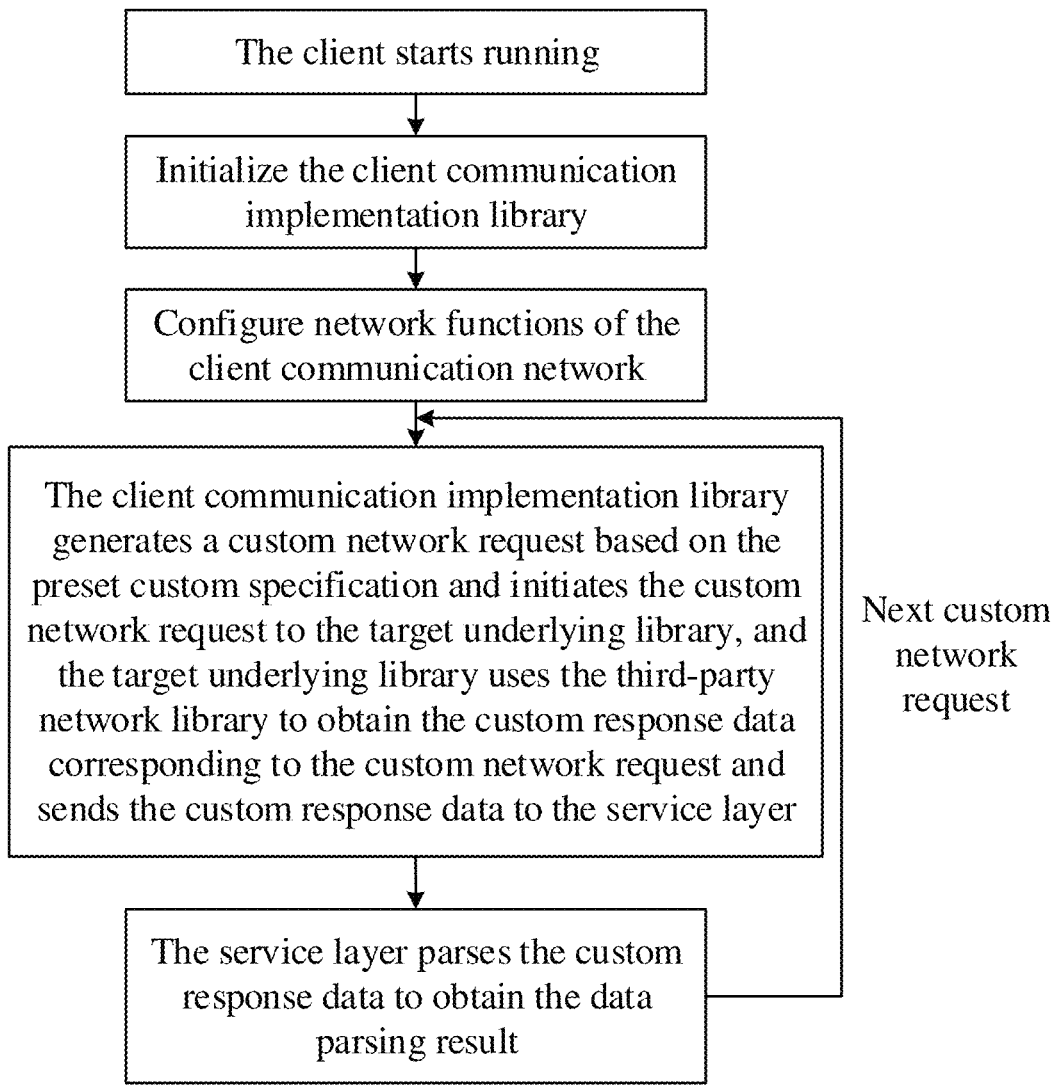
FIG. 10 is a schematic diagram of a custom request process according to an embodiment of the present disclosure.

Moreover, referring to FIG. 10, in an embodiment of the present disclosure, when the client starts running or after the client starts running, the client communication implementation library may also be initialized, for example, the client version number, the client channel and the like are configured. Moreover, the network functions of the client communication network may also be configured, for example, whether to enable the monitoring function to monitor the processing process of the network request. Thereafter, the client communication implementation library generates a custom network request based on the preset custom specification, and initiates the custom network request to the target underlying library. Moreover, the client communication implementation library sends various configuration information to the target underlying library; the target underlying library adjusts the custom network request based on these configuration information, uses the third-party network library to obtain the custom response data corresponding to the custom network request, and sends the custom response data to the service layer; and the service layer parses the custom response data to obtain the data parsing result.

After the data parsing result is obtained, the next custom network request can continue to be initiated.

The client may be a web browser used on the World Wide Web, an email client for sending and receiving emails, and/or instant messaging client software, etc., which is not specifically limited in the embodiments of the present disclosure.

Figure 11:
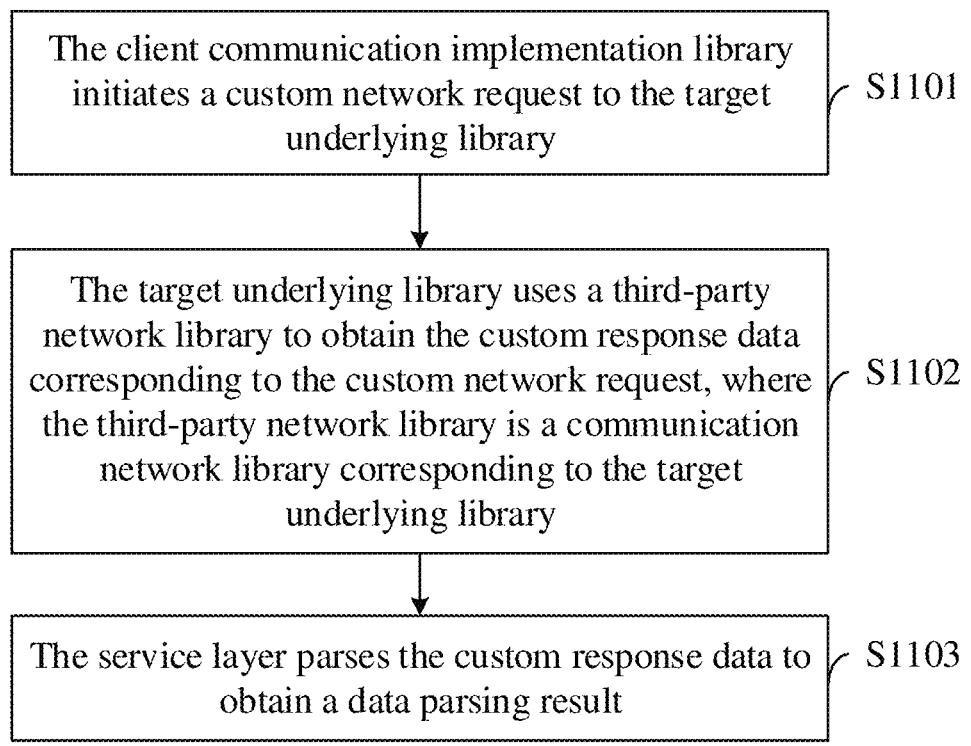
FIG. 11 is another schematic flowchart of a network request processing method according to an embodiment of the present disclosure.

An embodiment of the present disclosure provides a network request processing method, which can be applied to an electronic device, and the electronic device can be configured with the above-mentioned client communication network. The network request processing method provided in the embodiment of the present disclosure will be described below with reference to the schematic flowchart shown in FIG. 11. It should be noted that a logical sequence is shown in the schematic flow chart, but the steps shown or described may also be performed in other sequences in some cases. As shown in FIG. 11, the network request processing method includes S1101, S1102 and S1103.

In S1101, the client communication implementation library initiates a custom network request to the target underlying library.

In S1102, the target underlying library uses a third-party network library to obtain the custom response data corresponding to the custom network request, where the third-party network library is a communication network library corresponding to the target underlying library.

In S1103, the service layer parses the custom response data to obtain a data parsing result.

In some optional implementations, the step in which the target underlying library uses the third-party network library to obtain the custom response data corresponding to the custom network request, may include: converting the custom network request to obtain a standard network request available to the third-party network library: sending the standard network request to the third-party network library, so that the third-party network library initiates the standard network request to a server and obtains standard response data returned by the server based on the standard network request: obtaining the standard response data returned by the third-party network library; and encapsulating the standard response data into the custom response data corresponding to the custom network request.

In some optional implementations, the step in which the target underlying library converts the custom network request to obtain the standard network request available to the third-party network library, may include: parsing the custom network request to obtain a type of the custom network request and a data structure of the custom network request: determining a standard request structure corresponding to the type of the custom network request in the third-party network library when determining that the type of the custom network request belongs to types supported by the third-party network library; and converting the data structure of the custom network request according to the standard request structure, to obtain the standard network request available to the third-party network library.

In some optional implementations, the network request processing method may further include: the target underlying library sends a monitoring data packet to the service layer after receiving the monitoring data packet: where the monitoring data packet is obtained by the third-party network library by monitoring a processing process of the standard network request, and is sent to the target underlying library.

In some optional implementations, the step in which the target underlying library sends the monitoring data packet to the service layer, may include: extracting standard abnormal data from the monitoring data packet when the monitoring data packet carries the standard abnormal data: converting the standard abnormal data into corresponding custom abnormal data; and sending the custom abnormal data to the service layer by carrying the custom abnormal data in the monitoring data packet.

In some optional implementations, the step in which the client communication implementation library initiates the custom network request to the target underlying library, may include: generating the custom network request in response to a request triggering operation; determining the target underlying library for the custom network request from a plurality of candidate underlying libraries according to an underlying library selection instruction; and initiating the custom network request to the target underlying library.

In some optional implementations, the network request processing method may further include: the service layer obtains a historical request processing record related to the custom network request when monitoring the generation of the custom network request: the service layer determines the target underlying library with optimal processing performance for the custom network request from the plurality of candidate underlying libraries according to the historical request processing record: where the optimal processing performance includes a processing speed not less than a set speed threshold: the service layer generates the underlying library selection instruction based on identification information of the target underlying library; and the service layer sends the underlying library selection instruction to the client communication implementation library.

In some optional implementations, the plurality of candidate underlying libraries may include a target candidate underlying library, where a communication network library corresponding to the target candidate underlying library supports a third generation hypertext transfer protocol.

In some optional implementations, the custom network request is subject to custom constraint through a preset custom specification.

Moreover, the specific implementations of the above steps in the embodiment of the present disclosure can refer to the foregoing embodiments of the client communication network, and will not be described here.

According to the network request processing method provided in the embodiment of the present disclosure, the custom network request can be initiated by the client communication implementation library to the target underlying library: the target underlying library uses the third-party network library to obtain the custom response data corresponding to the custom network request, where the third-party network library is the communication network library corresponding to the target underlying library; and the service layer parses the custom response data to obtain the data parsing result. The target underlying library is added between the client communication implementation library and service layer and the third-party network library, and the target underlying library can use the third-party network library to obtain the custom response data corresponding to the custom network request, so that the client communication implementation library and the service layer do not need to pay attention to the implementation category in the third-party network library, realizing the decoupling of the service side from the third-party network library. In this way, even if the third-party network library needs to be replaced by other communication network library, there is no need to replace the client communication implementation library and the service layer, so that the service side is unaware of the replacement, thereby reducing the maintenance cost of the client communication network, and improving the stability of the client communication network.

Figure 12:
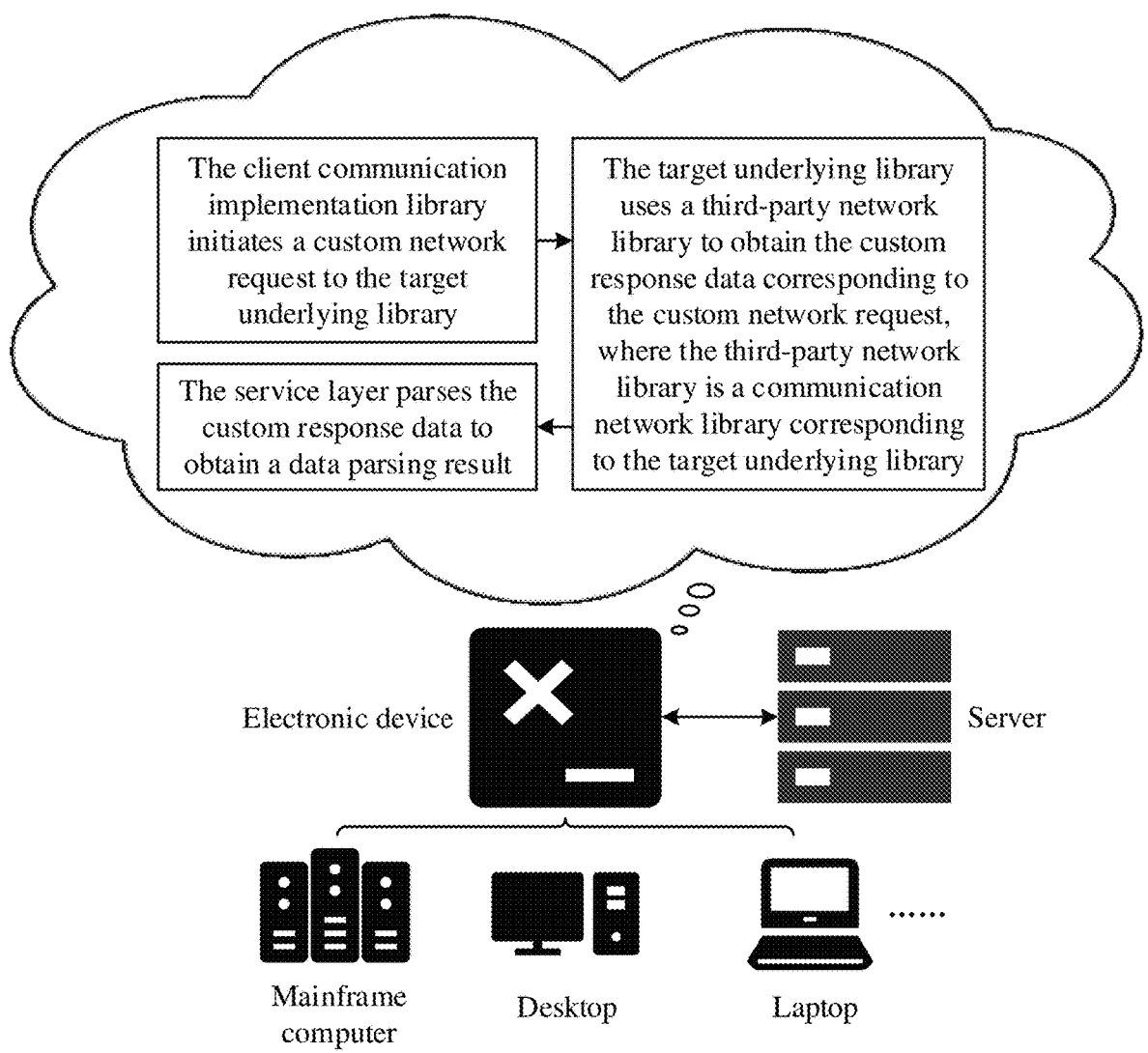
FIG. 12 is a schematic diagram of an application scenario of the network request processing method according to an embodiment of the present disclosure.

Referring to FIG. 12, it is a schematic diagram of an application scenario of the network request processing method according to an embodiment of the present disclosure.

As mentioned above, the network request processing method provided in the embodiment of the present disclosure is applied to the client communication network, and the client communication network can be mounted on an electronic device. Here, the electronic device is intended to represent various forms of digital computers, such as a mainframe computer, a desktop, a laptop, or other suitable terminal devices.

In the embodiment of the present disclosure, the electronic device may be configured to execute the network request processing method, including: a client communication implementation library initiates a custom network request to a target underlying library: the target underlying library uses a third-party network library to obtain the custom response data corresponding to the custom network request, where the third-party network library is a communication network library corresponding to the target underlying library; and a service layer parses the custom response data to obtain a data parsing result.

It should be noted that, in the embodiment of the present disclosure, the step in which the target underlying library uses the third-party network library to obtain the custom response data corresponding to the custom network request, may include: converting the custom network request to obtain a standard network request available to the third-party network library: sending the standard network request to the third-party network library, so that the third-party network library initiates the standard network request to a server and obtains standard response data returned by the server based on the standard network request: obtaining the standard response data returned by the third-party network library; and encapsulating the standard response data into the custom response data corresponding to the custom network request.

Moreover, it should be also noted that the scene schematic diagram shown in FIG. 12 is only illustrative and not restrictive in the embodiment of the present disclosure, those skilled in the art can make various obvious changes and/or replacements based on the example of FIG. 12, and the obtained technical solutions still belong to the disclosure scope of the embodiments of the present disclosure.

In the technical solution of the present disclosure, the acquisition, storage and application of the user's personal information involved are in compliance with relevant laws and regulations, and do not violate public order and good customs.

According to the embodiments of the present disclosure, the present disclosure further provides a communication system, an electronic device, a storage medium and a computer program product.

In an embodiment of the present disclosure, the communication system includes: a third-party network library, and the client communication network provided in the embodiments of the present disclosure. In the embodiment of the present disclosure, the specific implementations of the client communication network and the third-party network library can refer to the embodiments of the client communication network and the embodiments of the network request processing method, and will not be described in detail here.

Figure 13:
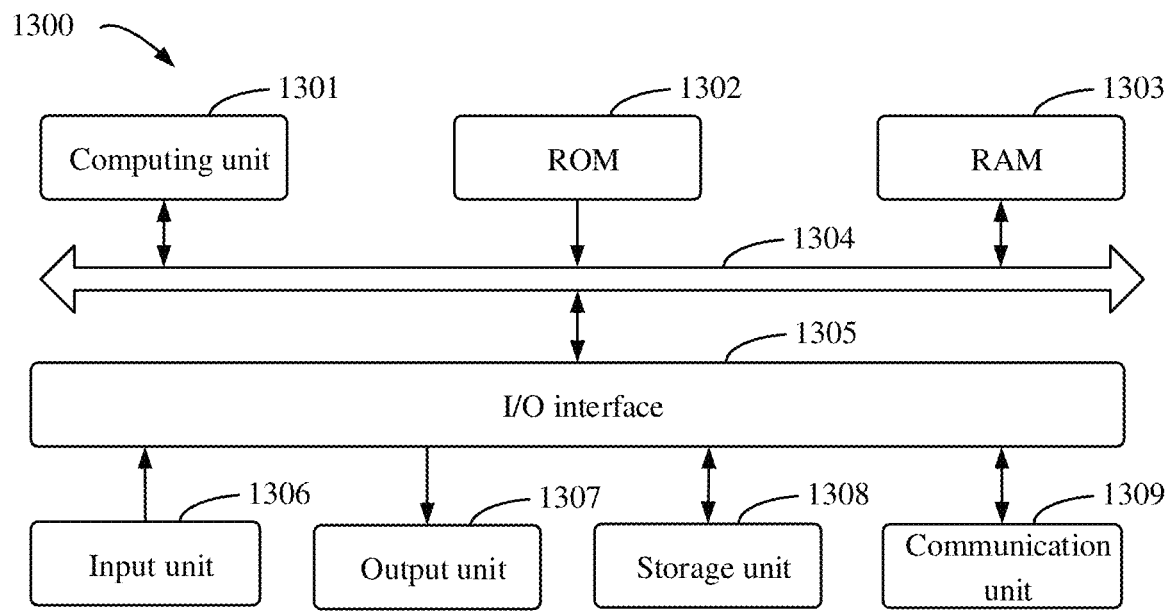
FIG. 13 is a schematic structural block diagram of an electronic device according to an embodiment of the present disclosure.

FIG. 13 shows a schematic block diagram of an exemplary electronic device 1300 that may be used to implement the embodiments of the present disclosure.

As mentioned above, in the embodiments of the present disclosure, the electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital assistant, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 13, the electronic device 1300 includes a computing unit 1301 that may perform various appropriate actions and processes according to a computer program stored in a Read-Only Memory (ROM) 1302 or a computer program loaded from a storage unit 1308 into a Random Access Memory (RAM) 1303. Various programs and data required for the operations of the electronic device 1300 may also be stored in the RAM 1303. The computing unit 1301, the ROM 1302 and the RAM 1303 are connected to each other through a bus 1304. The Input/Output (I/O) interface 1305 is also connected to the bus 1304.

A plurality of components in the electronic device 1300 are connected to the I/O interface 1305, and include: an input unit 1306 such as a keyboard, a mouse, or the like; an output unit 1307 such as various types of displays, speakers, or the like; a storage unit 1308 such as a magnetic disk, an optical disk, or the like; and a communication unit 1309 such as a network card, a modem, a wireless communication transceiver, or the like. The communication unit 1309 allows the electronic device 1300 to exchange information/data with other devices through a computer network such as the Internet and/or various telecommunication networks.

The computing unit 1301 may be various general-purpose and/or special-purpose processing components with processing and computing capabilities. Some examples of the computing unit 1301 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 1301 executes each method described above, for example, the network request processing method. For example, in some optional implementations, the network request processing method may be respectively implemented as a computer software program tangibly contained in a non-transitory computer-readable storage medium, such as the storage unit 1308. In some optional implementations, a part or all of the computer program may be loaded and/or installed on the electronic device 1300 via the ROM 1302 and/or the communication unit 1309. When the computer program is loaded into the RAM 1303 and executed by the computing unit 1301, one or more steps of the network request processing method described above may be performed. Alternatively, in other implementations, the computing unit 1301 may be configured to perform the network request processing method by any other suitable means (e.g., by means of firmware).

Various implementations of the system and technologies described above herein may be implemented in a digital electronic circuit system, an integrated circuit system, a Field Programmable Gate Array (FPGA), an Application Specific Integrated Circuit (ASIC), an Application Specific Standard Product (ASSP), a System On Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, the non-transitory computer-readable storage medium may be a tangible medium, which may contain or store a procedure for use by or in connection with an instruction execution system, device or apparatus. The non-transitory computer-readable storage medium may be a machine-readable signal medium or a machine-readable storage medium. The non-transitory computer-readable storage medium may include, but is not limited to, an electronic, magnetic, optical, electromagnetic, infrared or semiconductor system, device or apparatus, or any suitable combination thereof. More specific examples of the non-transitory computer-readable storage medium may include electrical connections based on one or more lines, a portable computer disk, a hard disk, an RAM, an ROM, an Erasable Programmable Read-Only Memory (EPROM) or a flash memory, an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display device (e.g., a Cathode Ray Tube (CRT) display or a Liquid Crystal Display (LCD)) configured to display information to the user; and a keyboard and a pointing device (e.g., a mouse or a trackball) through which the user may provide input to the computer. Other types of devices may also be configured to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a blockchain server.

An embodiment of the present disclosure further provides a non-transitory computer-readable storage medium storing a computer instruction thereon, and the computer instruction is used to cause a computer to execute the network request processing method described above.

An embodiment of the present disclosure further provides a computer program product including a computer program, and the computer program implements the network request processing method described above, when executed by a processor.

In the communication system, the electronic device, the medium and the computer program product provided by the embodiments of the present disclosure, the custom network request can be initiated by the client communication implementation library to the target underlying library: the target underlying library uses the third-party network library to obtain the custom response data corresponding to the custom network request, where the third-party network library is the communication network library corresponding to the target underlying library; and the service layer parses the custom response data to obtain the data parsing result. In the embodiment of the present disclosure, the target underlying library is added between the client communication implementation library and service layer and the third-party network library, and the target underlying library can use the third-party network library to obtain the custom response data corresponding to the custom network request, so that the client communication implementation library and the service layer do not need to pay attention to the implementation category in the third-party network library, realizing the decoupling of the service side from the third-party network library. In this way, even if the third-party network library needs to be replaced by other communication network library, there is no need to replace the client communication implementation library and the service layer, so that the service side is unaware of the replacement, thereby reducing the maintenance cost of the client communication network, and improving the stability of the client communication network.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein. Moreover, the relational terms such as "first", "second", "third", etc. in the present disclosure are only used to distinguish one entity or operation from another entity or operation, and do not necessarily require or imply any such actual relationship or sequence between these entities or operations. Furthermore, "a plurality of" in the present disclosure can be understood as at least two.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the spirit and principle of the present disclosure shall be included in the protection scope of the present disclosure.

What is claimed is:

1. A client communication network, comprising:
   a client communication implementation library configured to initiate a custom network request to a target underlying library;
   the target underlying library configured to use a third-party network library to obtain custom response data corresponding to the custom network request, the third-party network library is a communication network library corresponding to the target underlying library;
   wherein to use, by the target underlying library, the third-party network library to obtain the custom response data corresponding to the custom network request, comprises to:
      convert the custom network request to obtain a standard network request available to the third-party network library;
      send the standard network request to the third-party network library, so that the third-party network library initiates the standard network request to a server and obtains standard response data returned by the server based on the standard network request;
      obtain the standard response data returned by the third-party network library;
      encapsulate the standard response data into the custom response data corresponding to the custom network request; and
      send the custom response data a service layer; and
   the service layer configured to parse the custom response data to obtain a data parsing result.

2. The client communication network of claim 1, wherein the target underlying library is configured to:
   parse the custom network request to obtain a type of the custom network request and a data structure of the custom network request;
   determine a standard request structure corresponding to the type of the custom network request in the third-party network library, in a case of determining that the type of the custom network request belongs to types supported by the third-party network library; and
   convert the data structure of the custom network request according to the standard request structure, to obtain the standard network request available to the third-party network library.

3. The client communication network of claim 1, wherein the target underlying library is further configured to: send a monitoring data packet to the service layer after receiving the monitoring data packet; wherein the monitoring data packet is obtained by the third-party network library by monitoring a processing process of the standard network request, and is sent to the target underlying library.

4. The client communication network of claim 3, wherein the target underlying library is further configured to:
- extract standard abnormal data from the monitoring data packet, in a case where the monitoring data packet carries the standard abnormal data;
- convert the standard abnormal data into corresponding custom abnormal data; and
- send the custom abnormal data to the service layer by carrying the custom abnormal data in the monitoring data packet.

5. The client communication network of claim 1, wherein the client communication implementation library is configured to:
- generate the custom network request in response to a request triggering operation;
- determine the target underlying library for the custom network request from a plurality of candidate underlying libraries according to an underlying library selection instruction; and
- initiate the custom network request to the target underlying library.

6. The client communication network of claim 5, wherein the service layer is further configured to:
- obtain a historical request processing record related to the custom network request in a case of monitoring the generation of the custom network request;
- determine the target underlying library with optimal processing performance for the custom network request from the plurality of candidate underlying libraries according to the historical request processing record; wherein the optimal processing performance comprises a processing speed not less than a set speed threshold;
- generate the underlying library selection instruction based on identification information of the target underlying library; and
- send the underlying library selection instruction to the client communication implementation library.

7. The client communication network of claim 5, wherein the plurality of candidate underlying libraries comprise a target candidate underlying library, wherein a communication network library corresponding to the target candidate underlying library supports a third generation hypertext transfer protocol.

8. The client communication network of claim 1, wherein the custom network request is subject to custom constraint through a preset custom specification.

9. A network request processing method, applied to an electronic device configured with a client communication implementation library, a target underlying library and a service layer; wherein the method comprises:
- initiating, by the client communication implementation library, a custom network request to the target underlying library;
- using, by the target underlying library, a third-party network library to obtain custom response data corresponding to the custom network request, the third-party network library is a communication network library corresponding to the target underlying library;
- wherein using, by the target underlying library, the third-party network library to obtain the custom response data corresponding to the custom network request, comprises:
  - converting, by the target underlying library, the custom network request to obtain a standard network request available to the third-party network library;
  - sending, by the target underlying library, the standard network request to the third-party network library, so that the third-party network library initiates the standard network request to a server and obtains standard response data returned by the server based on the standard network request;
  - obtaining, by the target underlying library, the standard response data returned by the third-party network library;
  - encapsulating, by the target underlying library, the standard response data into the custom response data corresponding to the custom network request; and
  - sending the custom response data to the service layer; and
- parsing, by the service layer, the custom response data to obtain a data parsing result.

10. The method of claim 9, wherein converting, by the target underlying library, the custom network request to obtain the standard network request available to the third-party network library, comprises:
- parsing, by the target underlying library, the custom network request to obtain a type of the custom network request and a data structure of the custom network request;
- determining, by the target underlying library, a standard request structure corresponding to the type of the custom network request in the third-party network library in a case of determining that the type of the custom network request belongs to types supported by the third-party network library; and
- converting, by the target underlying library, the data structure of the custom network request according to the standard request structure, to obtain the standard network request available to the third-party network library.

11. The method of claim 9, further comprising: sending, by the target underlying library, a monitoring data packet to the service layer after receiving the monitoring data packet; wherein the monitoring data packet is obtained by the third-party network library by monitoring a processing process of the standard network request, and is sent to the target underlying library.

12. The method of claim 11, wherein sending, by the target underlying library, the monitoring data packet to the service layer, comprises:
- extracting, by the target underlying library, standard abnormal data from the monitoring data packet, in a case where the monitoring data packet carries the standard abnormal data;
- converting, by the target underlying library, the standard abnormal data into corresponding custom abnormal data; and
- sending, by the target underlying library, the custom abnormal data to the service layer by carrying the custom abnormal data in the monitoring data packet.

13. The method of claim 9, wherein initiating, by the client communication implementation library, the custom network request to the target underlying library, comprises:
- generating, by the client communication implementation library, the custom network request in response to a request triggering operation;
- determining, by the client communication implementation library, the target underlying library for the custom network request from a plurality of candidate underlying libraries according to an underlying library selection instruction; and initiating, by the client communication implementation library, the custom network request to the target underlying library.

14. The method of claim 13, further comprising:

obtaining, by the service layer, a historical request processing record related to the custom network request in a case of monitoring the generation of the custom network request;

determining, by the service layer, the target underlying library with optimal processing performance for the custom network request from the plurality of candidate underlying libraries according to the historical request processing record; wherein the optimal processing performance comprises a processing speed not less than a set speed threshold;

generating, by the service layer, the underlying library selection instruction based on identification information of the target underlying library; and sending, by the service layer, the underlying library selection instruction to the client communication implementation library.

15. The method of claim 13, wherein the plurality of candidate underlying libraries comprise a target candidate underlying library, wherein a communication network library corresponding to the target candidate underlying library supports a third generation hypertext transfer protocol;

wherein the custom network request is subject to a custom constraint through a preset custom specification.

16. A communication system, comprising:

a third-party network library; and a client communication network, comprising:

a client communication implementation library configured to initiate a custom network request to a target underlying library;

the target underlying library configured to use a third-party network library to obtain custom response data corresponding to the custom network request, the third-party network library is a communication network library corresponding to the target underlying library;

wherein to use, by the target underlying library, the third-party network library to obtain the custom response data corresponding to the custom network request, comprises to:

convert the custom network request to obtain a standard network request available to the third-party network library;

send the standard network request to the third-party network library, so that the third-party network library initiates the standard network request to a server and obtains standard response data returned by the server based on the standard network request;

obtain the standard response data returned by the third-party network library;

encapsulate the standard response data into the custom response data corresponding to the custom network request; and send the custom response data a service layer; and the service layer configured to parse the custom response data to obtain a data parsing result.

17. The method of claim 9, wherein the electronic device comprises:

at least one processor; and a memory connected in communication with the at least one processor;

wherein the memory stores instructions executable by the at least one processor, and the instructions, when executed by the at least one processor, enables the at least one processor to execute the method.

18. The method of claim 9, wherein a non-transitory computer-readable storage medium storing computer instructions thereon, and wherein the computer instructions are used to cause a computer to execute the method.

* * * * *